UNITED STATES PATENT OFFICE.

JAMES P. A. McCOY, OF WILKINSBURG, PENNSYLVANIA, ASSIGNOR TO WESTINGHOUSE ELECTRIC AND MANUFACTURING COMPANY, A CORPORATION OF PENNSYLVANIA.

CEMENT AND PROCESS OF MAKING SAME.

1,236,190. Specification of Letters Patent. Patented Aug. 7, 1917.

No Drawing. Application filed February 3, 1916. Serial No. 76,020.

*To all whom it may concern:*

Be it known that I, JAMES P. A. McCOY, a subject of the King of Great Britain, and a resident of Wilkinsburg, in the county of Allegheny and State of Pennsylvania, have invented a new and useful Improvement in Cement and Process of Making Same, of which the following is a specification.

My invention relates to plastic compositions and especially to the production of cements that are adapted for use in sealing vacuum apparatus.

One object of my invention is to provide a cement of the above indicated character which shall be impervious to gases and which shall also have substantially no vapor pressure at moderate temperatures so that it may be used in connection with evacuated apparatus without permitting infiltration of air or liberation of vacuum-destroying gases from the cement itself.

Another object of my invention is to provide a method of treating cementitious materials to render them suitable for use in sealing evacuated apparatus.

The cement prepared in accordance with my present invention consists essentially of gutta percha or a rubber and a resin of the para-cumaron and para-indene type, together with a suitable filler. As the equivalent of gutta percha for this purpose, any of the natural rubbers may be used, such, for example, as caoutchouc, balata or pontianak, and the resins which I prefer to employ for my purpose are the coal tar products described in my copending application for Letters Patent Serial No. 20,752, filed April 12, 1915, these resins consisting of a mixture of cumaron, indene, para-cumaron and para-indene. The filler may be of any suitable character, such as ground or precipitated chalk. The foregoing ingredients may be mixed in a wide variety of proportions, the rubber constituting from 10% to 50% of the mass, while the para-resins may be used in proportions of from 50% to 80%. Illustrative examples of cements which I have prepared, using gutta percha as the rubber ingredient, are given in the following table, in which the figures represent parts by weight.

|              | No. 1. | No. 2. | No. 3. | No. 4. |
|--------------|--------|--------|--------|--------|
| Gutta percha | 50     | 40     | 10     | 20     |
| Para-resins  | 20     | 20     | 50     | 40     |
| Chalk        | 30     | 40     | 40     | 20     |

When balata rubber is used instead of gutta percha, its proportion may be increased considerably beyond the amounts permissible when gutta percha is used, and may amount to eighty or ninety per cent. of the mixture.

I find it advantageous to make use of vacuum treatment in preparing the cements described above, such vacuum treatment being applied either to the para-resins before they are mixed with the other ingredients or to the mixture of resins, rubber and filler. For example, I have obtained an excellent cement for use in sealing evacuated apparatus by preparing a mixture according to example No. 4 in the above table and heating the mixture to fluidity in a closed vessel which is exhausted of air as completely as possible, the vessel being conveniently heated by means of an oil bath and the heat being carried up to about 260° C., if desired. I prefer to agitate the mixture during the heat treatment and this agitation may conveniently be accomplished by providing a stirrer of magnetic material within the treating vessel and a movable magnet outside of the vessel for operating the stirrer. The vacuum treatment should be continued until the contents of the vessel show substantially no vapor pressure.

The cements prepared in the foregoing manner may be repeatedly melted and solidified without impairing their properties and are exceedingly tough, the resins appearing to lose their original brittleness. The cement specifically described above and containing about 20 parts of gutta percha, about 40 parts of para-resins and about 20 parts of chalk, melts at approximately 100° C. and has substantially no vapor pressure at that temperature.

One very important application of my cements is in sealing current rectifiers and other electric apparatus where high vacua are required. Ordinary cementing materials are unsuitable for these uses on account of their substantial vapor pressure and the consequent destruction of the vacuum by reason of the liberation of gases from the cements. Since my cements possess substantially no vapor pressure at 100° C., they are free from this disadvantage, and, in addition, possess, a high degree of adhesiveness and mechanical strength.

In its broadest aspect, the process herein described is applicable to the treatment of all cementitious materials which can be rendered substantially free from vapor pressure, at operating temperatures, by the application of heat under sub-atmospheric pressure.

It is to be understood that the expression "a rubber" in the subjoined claims includes not only the natural rubbers, such as caoutchouc, balata and pontianak, but gutta percha as well. The above specific examples are intended to be merely illustrative, and it is to be understood that my invention comprehends all such changes in materials, proportions and process steps as fall within the scope of the appended claims.

I claim as my invention:

1. A plastic composition comprising a rubber, a para-resin and a filler.

2. A plastic composition comprising gutta percha, a filler and a resinous material containing cumaron, indene, para-cumaron and para-indene.

3. A plastic composition comprising a rubber, a resinous substance and a filler and having substantially no vapor pressure at its melting temperature.

4. A plastic composition comprising a rubber, a resinous coal-tar product and a filler and having substantially no vapor pressure at 100° C.

5. The process of preparing plastic compositions that comprises subjecting a cementitious material to heat under sub-atmospheric pressure until the said material exhibits substantially no vapor pressure.

6. The process of preparing plastic compositions that comprises subjecting a resinous material to heat under sub-atmospheric pressure until the said material exhibits substantially no vapor pressure.

7. The process of preparing plastic compositions that comprises subjecting a resinous coal-tar product to heat under sub-atmospheric pressure until the said material exhibits substantially no vapor pressure.

8. The process of preparing plastic compositions that comprises subjecting a mixture containing a rubber and a resinous coal-tar product to heat under sub-atmospheric pressure.

9. The process of preparing plastic compositions that comprises subjecting a mixture containing a rubber and a resinous coal-tar product to heat under sub-atmospheric pressure until the mixture exhibits substantially no vapor pressure.

In testimony whereof, I have hereunto subscribed my name this 27th day of Jan., 1916.

JAMES P. A. McCOY.